United States Patent [19]
Anderson

[11] Patent Number: 5,821,660
[45] Date of Patent: Oct. 13, 1998

[54] BRUSHLESS DIRECT CURRENT MOTOR HAVING ADJUSTABLE MOTOR CHARACTERISTICS

[75] Inventor: William G. Anderson, Victoria, Minn.

[73] Assignee: MTS Systems Corporation, Eden Prairie, Minn.

[21] Appl. No.: 811,665

[22] Filed: Mar. 5, 1997

[51] Int. Cl.⁶ .................................. H02P 1/26; H02K 3/00
[52] U.S. Cl. ........................ 310/184; 310/189; 310/198; 310/200; 318/254; 318/138; 318/281
[58] Field of Search ........................... 310/184, 156, 310/189, 198, 200, 209; 318/254, 138, 281

[56] References Cited

U.S. PATENT DOCUMENTS

| | | |
|---|---|---|
| 1,467,745 | 9/1923 | Zederbohm . |
| 2,519,895 | 8/1950 | Edwards et al. ............... 310/156 X |
| 2,795,712 | 6/1957 | Suhr ............................... 310/198 |
| 3,153,183 | 10/1964 | Brammerlo et al. ............. 318/184 |
| 3,274,471 | 9/1966 | Moczala ........................... 318/138 |
| 3,290,572 | 12/1966 | Hartmann et al. ............... 318/138 |
| 3,304,481 | 2/1967 | Saussele ........................... 318/138 |
| 3,329,852 | 7/1967 | Saussele et al. ................. 318/138 |
| 3,369,381 | 2/1968 | Crane et al. ...................... 68/12 |
| 3,475,668 | 10/1969 | Mieslinger ....................... 318/138 |
| 3,488,566 | 1/1970 | Fukuda ............................. 318/138 |
| 3,531,702 | 9/1970 | Hill .................................. 318/138 |
| 3,573,590 | 4/1971 | Reed ................................ 318/618 |
| 3,599,062 | 8/1971 | Crane et al. ...................... 318/281 |
| 3,611,081 | 10/1971 | Watson ............................ 318/138 |
| 3,611,082 | 10/1971 | Schmitz ........................... 318/771 |
| 3,624,471 | 11/1971 | Japp et al. ..................... 318/225 R |
| 3,634,873 | 1/1972 | Nishimura ...................... 318/254 |
| 3,643,143 | 2/1972 | Rakes ............................... 318/254 |
| 3,651,368 | 3/1972 | Hanada ............................ 318/254 |
| 3,663,878 | 5/1972 | Miyasaka ........................ 318/254 |
| 3,689,815 | 9/1972 | Thibaut ........................... 318/281 |
| 3,780,363 | 12/1973 | Doemen et al. ................. 318/254 |
| 3,783,357 | 1/1974 | Ichiyanage ...................... 318/138 |
| 3,829,749 | 8/1974 | Richt ............................... 318/331 |
| 3,906,320 | 9/1975 | Doemen .......................... 318/331 |
| 3,916,257 | 10/1975 | Harper, Jr. ....................... 318/771 |
| 3,932,793 | 1/1976 | Müller ............................. 318/138 |
| 3,938,014 | 2/1976 | Nakajima ........................ 318/138 |
| 3,942,083 | 3/1976 | Takahashi et al. ............. 318/138 |
| 3,969,658 | 7/1976 | Htsui .............................. 318/202 |
| 3,986,086 | 10/1976 | Müller ............................. 318/138 |
| 3,997,823 | 12/1976 | Machida ......................... 318/138 |
| 4,004,202 | 1/1977 | Davis ............................... 318/138 |
| 4,005,347 | 1/1977 | Erdman ........................... 318/254 |
| 4,025,833 | 5/1977 | Lawton ............................ 318/781 |
| 4,027,215 | 5/1977 | Knight et al. ................... 318/341 |
| 4,030,005 | 6/1977 | Doemen .......................... 318/138 |

(List continued on next page.)

OTHER PUBLICATIONS

William G. Anderson, Custom Servo Motors Inc., New Ulm, Minn., "NdFeB Magnet Material In High Performance Brushless Servo Motors", Mar. 1992 issue of Motion Control Magazine, pp. 1–6.

"These Motors Shift Gears On Their Own", Business Week, Oct. 10, 1994, pp. 124 and 126.

Brochure: "Application Package—Spindle Motor/Amplifier Package", Custom Servo Motors Inc., 1995, pp. 1–5. no month.

Engineering Handbook entitled "DC Motors Speed Controls Servo Systems", Electro–Craft Corporation, 1980, pp. ii–v; 6–1—6–35. no month.

*Primary Examiner*—Thomas M. Dougherty
*Assistant Examiner*—Tran N. Nguyen
*Attorney, Agent, or Firm*—Westman, Champlin & Kelly, P.A.; S. Koehler

[57] ABSTRACT

A brushless direct current motor includes a permanent magnet rotor and a set of stator windings. The motor further includes a circuit for changeably connecting the set of stator windings to operate in a first electrical configuration or a second electrical configuration. In the second electrical configuration, the circuit connects only some of the stator windings for receiving current. The circuit electrically isolates the unused stator windings from the used or connected stator windings.

38 Claims, 5 Drawing Sheets

U.S. PATENT DOCUMENTS

| | | | |
|---|---|---|---|
| 4,064,443 | 12/1977 | Yamada et al. | 318/331 |
| 4,162,435 | 7/1979 | Wright | 318/254 |
| 4,167,692 | 9/1979 | Sekiya et al. | 318/138 |
| 4,169,990 | 10/1979 | Lerdman | 318/138 |
| 4,227,106 | 10/1980 | Druss et al. | 310/184 |
| 4,228,384 | 10/1980 | Arnold, Jr. et al. | 318/254 |
| 4,250,435 | 2/1981 | Alley et al. | 318/138 |
| 4,250,544 | 2/1981 | Alley | 364/110 |
| 4,327,302 | 4/1982 | Hershberger | 310/156 |
| 4,404,485 | 9/1983 | Ban et al. | 310/207 X |
| 4,426,771 | 1/1984 | Wang et al. | 29/596 |
| 4,477,760 | 10/1984 | Kuznetsov | 318/773 |
| 4,479,078 | 10/1984 | Kidd et al. | 318/254 |
| 4,528,485 | 7/1985 | Boyd, Jr. | 318/138 |
| 4,675,591 | 6/1987 | Pleiss | 318/773 |
| 4,691,155 | 9/1987 | Taylor et al. | 318/771 |
| 4,736,147 | 4/1988 | Shizhang | 318/778 |
| 4,890,049 | 12/1989 | Auinger | 318/771 |
| 4,897,583 | 1/1990 | Rees | 318/254 |
| 4,988,273 | 1/1991 | Faig et al. | 425/145 |
| 5,049,800 | 9/1991 | Kohari et al. | 318/771 |
| 5,065,305 | 11/1991 | Rich | 318/771 |
| 5,068,559 | 11/1991 | Satake et al. | 318/771 X |
| 5,068,587 | 11/1991 | Nakamura | 318/771 |
| 5,130,628 | 7/1992 | Owen | 318/789 |
| 5,134,332 | 7/1992 | Nakamura et al. | 310/208 |
| 5,142,213 | 8/1992 | Stelter | 318/771 |
| 5,177,423 | 1/1993 | Nakamura et al. | 318/767 |
| 5,233,280 | 8/1993 | Ghosh | 318/800 |
| 5,274,317 | 12/1993 | Utley et al. | 318/802 |
| 5,296,796 | 3/1994 | Clower | 318/808 |
| 5,300,870 | 4/1994 | Smith | 318/768 |
| 5,317,248 | 5/1994 | Utley et al. | 318/811 |
| 5,350,988 | 9/1994 | Le | 318/618 |
| 5,352,964 | 10/1994 | Nakamura et al. | 318/772 |
| 5,425,165 | 6/1995 | Shramo et al. | 29/596 |
| 5,442,250 | 8/1995 | Stridsberg | 310/186 |
| 5,486,747 | 1/1996 | Welch | 318/811 |
| 5,614,799 | 3/1997 | Anderson et al. | 318/439 |

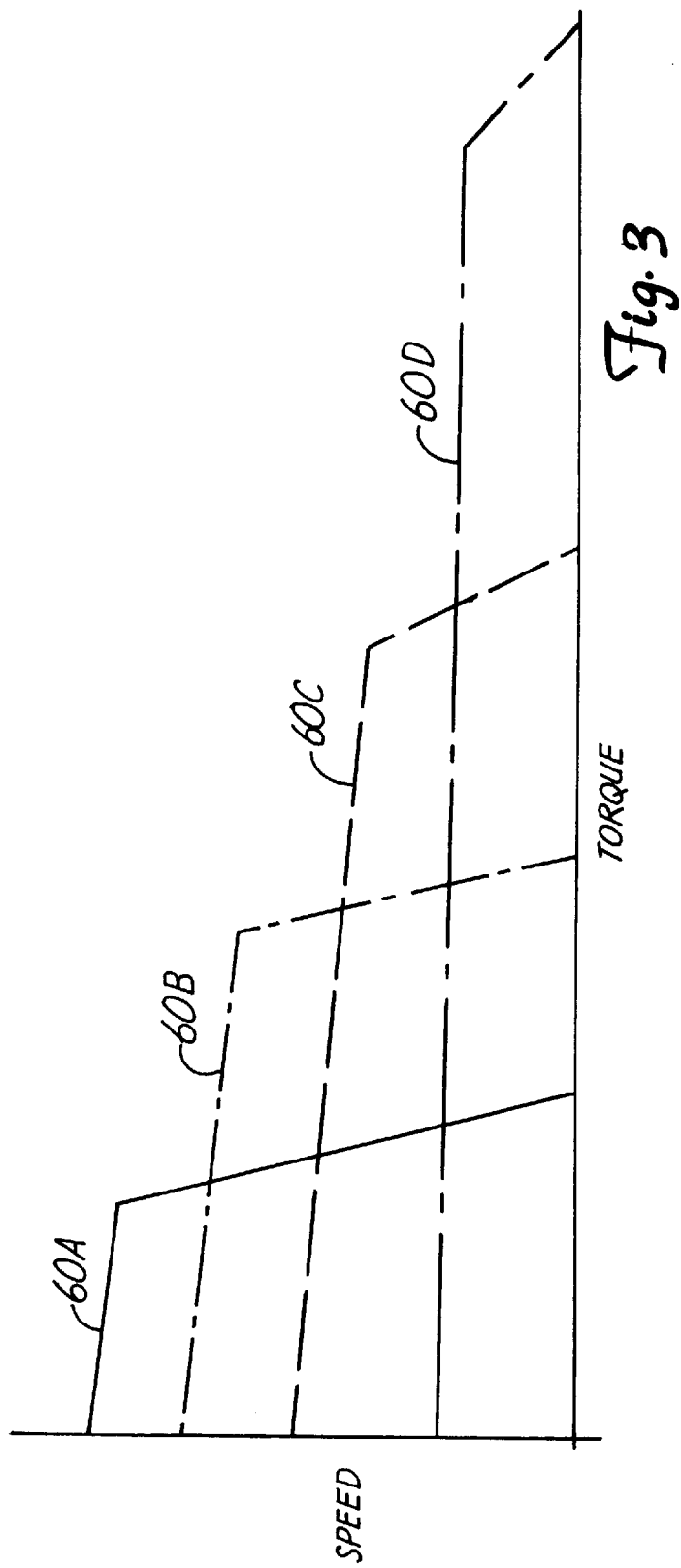

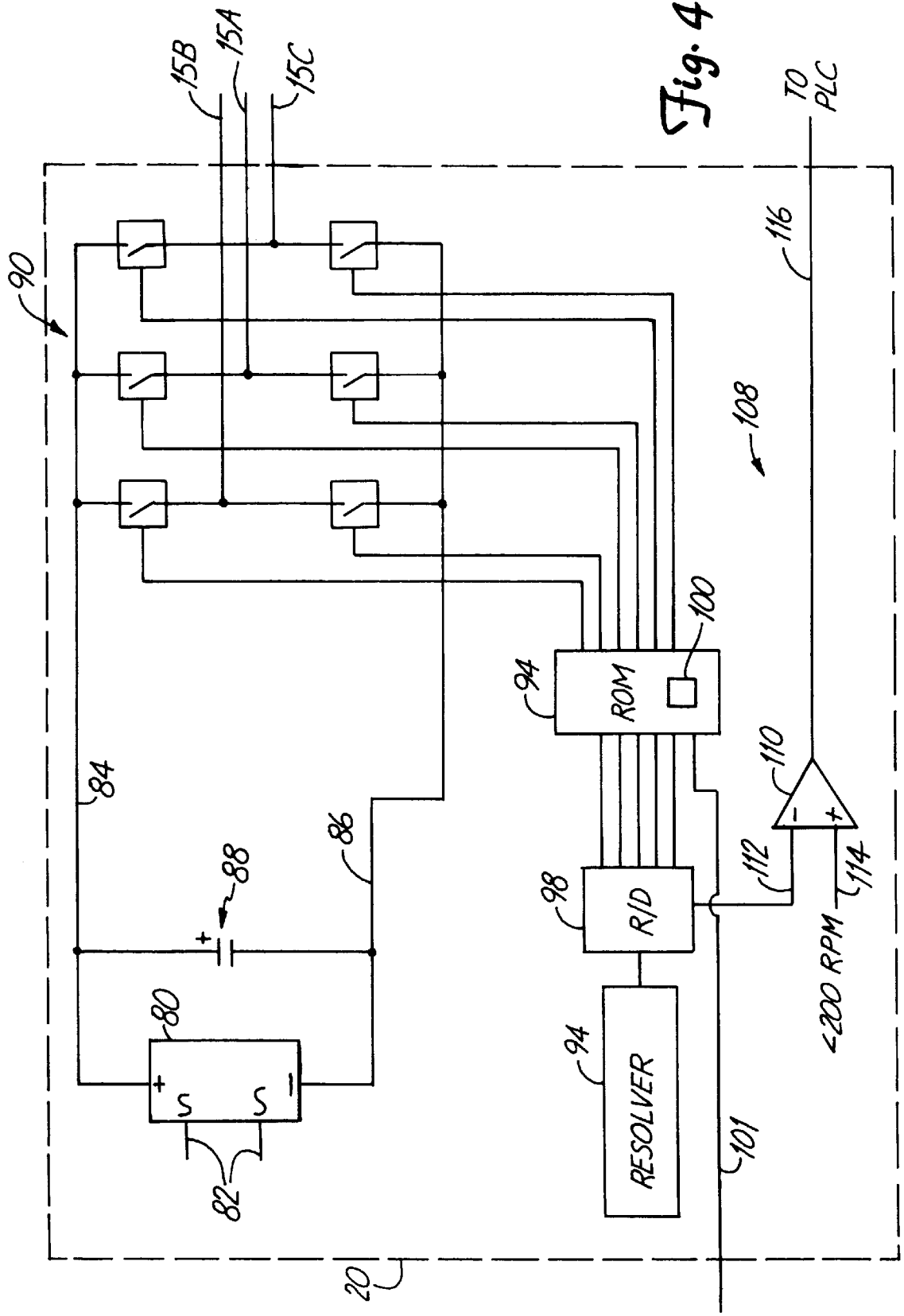

BRUSHLESS DIRECT CURRENT MOTOR HAVING ADJUSTABLE MOTOR CHARACTERISTICS

BACKGROUND OF THE INVENTION

The present invention relates to a brushless direct current motor having permanent magnets mounted to a rotor and commutated stator windings. More particularly, the present invention relates to a brushless direct current motor having adjustable speed and torque characteristics.

Brushless direct current motors with electronically commutated stator windings and permanent magnets mounted to the rotor are currently a subject of much interest. These motors provide a means of meeting the increasing demand for controllable, high-speed, low-maintenance motors for an ever increasing range of power ratings. The motor includes an inverter that applies commutated voltage and current to each phase of the stator windings. The speed of the motor is controlled by controlling the voltage amplitude applied to the stator windings, while the torque output from the motor is linearly proportional to the current through the windings. Commonly, the stator windings are connected either in a delta electrical configuration or a wye electrical configuration, depending on the desired motor performance. For example, if maximum speed is desired from a motor of a given horsepower rating, the stator windings are hard wired in a delta electrical configuration. If, on the other hand, maximum torque is desired from the motor, the stator windings are hard wired in a wye electrical configuration.

In many applications, however, it is not possible to choose a brushless direct current motor of the prior art that will have optimum motor characteristics for a given mechanical load. This is the case since many mechanical loads are not constant over time. Rather, both the operating speed and, more importantly, the torque required from the motor will vary over time. When motors are used in manufacturing processes, it is generally desirable to have high operating speeds in order to increase the rate of production of goods. Since large amounts of torque will also be required from the motor, the motor is generally over-rated for its intended use. In a brushless direct current motor, expensive inverters capable of handling the increased current necessary to generate the torque must be used. Likewise, larger diameter wires must also be used throughout the motor to handle the increased current, and additional heat dissipating devices must be used to dissipate the heat generated from these larger components. Accordingly, the size, weight and complexity of the motor will increase, increasing its cost and thereby making it less attractive for the intended use.

SUMMARY OF THE INVENTION

A brushless direct current motor includes a permanent magnet rotor and a set of stator windings. The motor further includes a circuit for changeably connecting the set of stator windings to operate in a first electrical configuration or a second electrical configuration. In the second electrical configuration, the circuit connects only some of the stator windings for receiving current. The circuit electrically isolates the unused stator windings from the used or connected stator windings.

A method for configuring a brushless direct current motor to have different torque and speed characteristics is also disclosed. The method includes the steps of: providing a plurality of stator windings operably coupleable to a rotor having permanent magnets; connecting the plurality of stator windings in a first electrical configuration wherein all of the stator windings are used or a second electrical configuration wherein less that all of the stator windings are used; and electrically isolating the unused stator windings from the connected stator windings when the stator windings are connected in the second electrical configuration.

As used herein, "electrically isolated" shall mean that the voltage generated from the back electromotive force (back-EMF) as the permanent magnets of the rotor interact with unused windings does not add together in series with the voltage across the connected or used windings. A commutation circuit is provided for commutating the connected stator windings when connected in the first electrical configuration or the second electrical configuration.

In one embodiment, a set of stator windings comprises a first plurality of windings having a first number of turns, a second plurality of windings having a second number of turns, a third plurality of windings having a third number of turns and a fourth plurality of windings having a fourth number of turns, wherein the fourth number is greater than the third number, which is greater than the second number, which is greater than the first number. The circuit selectively connects the first, second, third and fourth plurality windings alone, or in series forming the first electrical configuration, the second electrical configuration, a third electrical configuration and a fourth electrical configuration, wherein each of the electrical configuration comprises a wye configuration.

For instance, when less torque, but more speed is required for a given mechanical load, the circuit for changeably connecting the set of stator windings connects only the first plurality of stator windings in a wye configuration. Each of the remaining stator windings of second, third and fourth pluralities are electrically isolated from the first plurality of stator windings, and preferably, from each other plurality of stator windings. By electrically isolating each of the unused plurality of windings, excessive voltage conditions are prevented, thereby reducing the required insulation, while still providing a wide range of torque and speed characteristics.

The present invention provides a motor suitable for applications when different speed and torque requirements are required during operation. For example, the present invention can be used as a drive motor in a machining apparatus. The drive motor controls movement of a table. The table supports a workpiece to be machined, moving it relative to a machining spindle. In many machining apparatuses, the load on the drive motor continually varies in a cyclic manner during machining of the workpiece. For instance, when the machine is cutting or preparing a surface of the workpiece, the torque required for moving the workpiece into engagement with the cutting tool is quite high while the rate of which the cutting tool moves relative to the surface of the workpiece is rather slow. When the machining spindle reaches the end of the surface being machined, the drive motor returns the table and thus the workpiece to or substantially near its starting position. During retraction, the cutting tool is not engaging the work surface therefore the torque placed on the drive motor is low.

The present invention provides a motor well suited for these types of cyclic loads. When the load requires a high torque and a slower rate, the motor is connected in a suitable electrical configuration, for instance, the wye electrical configuration with all of stator windings appropriately connected in series. Similarly, when increased speed of the motor is required with less torque, only some of the windings are used with the remaining being electrically isolated.

The invention is not limited to the machine tool art, but is merely described for purposes of possible applications. The present invention is also well suited for other mechanical applications such as drive motors for electric cars.

BRIEF DESCRIPTION OF THE DRAWINGS

FIG. 3 is a plot of motor speed versus motor torque for the electrical configurations of FIGS. 2A–2D; and FIG. 4 is a schematic representation of the motor drive.

DETAILED DESCRIPTION OF THE PREFERRED EMBODIMENTS

Figure 1:
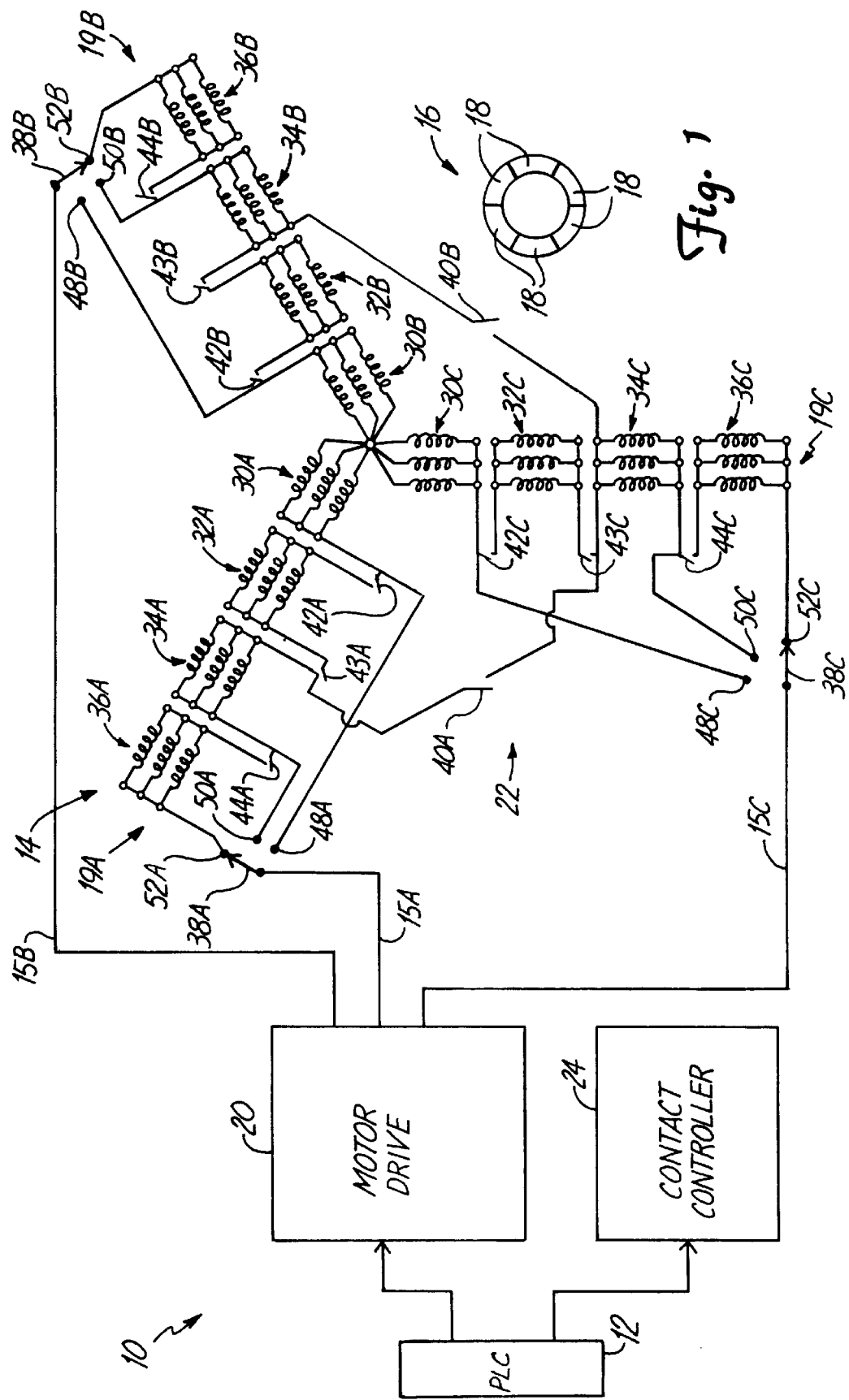
FIG. 1 is a schematic representation of a brushless direct current motor of the present invention connected to a process line controller.

A brushless direct current motor having adjustable motor characteristics of the present invention is illustrated generally at 10 in FIG. 1. The motor 10 is connected to and receives speed control signals from a controller 12 such as a process line controller used in machining apparatuses. Generally, the motor 10 includes stationary stator windings 14 mounted in a suitable frame, not shown. A rotor, schematically illustrated at 16, is also mounted to the frame for rotation about a central axis. The rotor 16 typically includes a number of permanent magnets 18 secured thereto. Preferably, the permanent magnets are made of Neodymium-Iron-Boron (NdFeB) material. Use of NdFeB magnetic material in brushless direct current motors is described in "NdFeB Magnetic Material in High Performance Brushless Servo Motors", by William G. Anderson, published in Motion Control Magazine, March, 1992, and is hereby incorporated by reference.

The motor 10 further includes a motor drive 20 that provides commutated current waveforms to the set of stator windings 14. As illustrated in FIG. 1, the stator windings 14 are connected to each other and to the motor drive with a plurality of contacts 22 which are selectively controlled by a contact controller 24. The contact controller 24 connects the set of stator windings 14 in various electrical configurations, as discussed below, to provide the motor 10 with desired speed and torque characteristics. As is conventionally known, constant torque is produced when rectangular current waveforms are applied to the stator windings 14. The current waveforms are discontinuously applied for durations of 120 degrees as opposed to the continuous application of sinusoidal current over 180 degrees in an alternating current motor. The amplitude of voltage in the motor 10 is proportional with rotor speed; and therefore, motor speed is controlled by controlling the voltage amplitude of the signal applied to the stator windings 14. For uniform torque generation, regardless of the rotor position, current commutation has to occur at predetermined rotor angles.

In the embodiment illustrated, the stator windings 14 comprise four pluralities wherein a first plurality includes windings 30A, 30B and 30C; a second plurality includes windings 32A, 32B and 32C; a third plurality includes windings 34A, 34B and 34C; and a fourth plurality includes windings 36A, 36B and 36C. (Each of the windings 30A–30C, 32A–32C, 34A–34C and 36A–36C includes three identical windings.)

The motor 10 is a three-phase motor wherein the stator windings 14 are organized in three phases 19A, 19B and 19C. Voltage is applied to the stator windings 14 along three conductors 15A, 15B and 15C from the motor drive 20.

FIGS. 2A–2D illustrate four electrical configurations for operating the motor 10 to obtain various speed and torque characteristics. For purposes of explanation, the plurality of contacts 22 illustrated in FIG. 1 are separated into sub-pluralities identified as main contacts 38A, 38B and 38C; neutral-forming contacts 40A and 40B; and series contacts 42A, 42B, 42C, 43A, 43B, 43C, 44A, 44B, and 44C. The contacts 38A–38C, 40A–40B, 42A–44C connect or electrically isolate the four plurality of stator windings 30A–30C, 32A–32C, 34A–34C and 36A–36C together in the various configurations illustrated in FIGS. 2A–2D, herein wye configurations although delta configurations can also be constructed using appropriate contacts. In addition, switching between wye and delta configurations as described in U.S. patent application Ser. No. 08/582,029 filed Jan. 2, 1996, assigned to the same assignee as the present application and incorporated herein by reference, can also be performed with suitable contacts and appropriate phase shifts in the commutation signals.

Figure 2A:
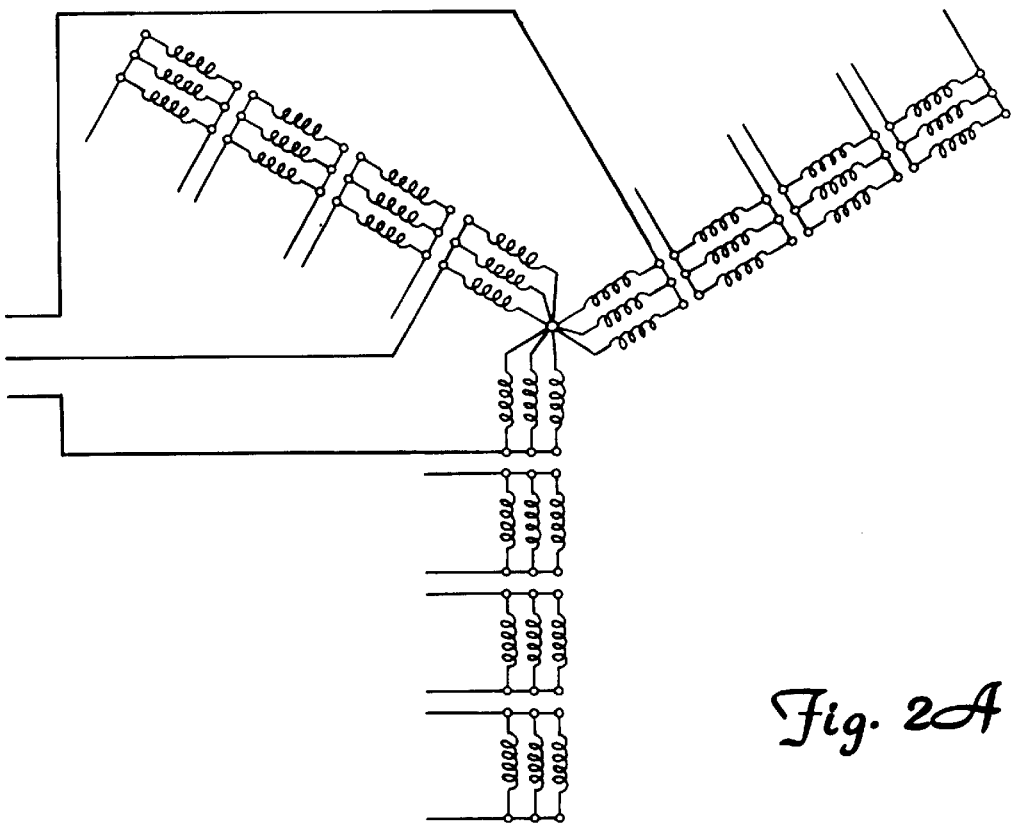
FIG. 2A is a schematic representation of stator windings of the motor of the present invention connected in a first electrical configuration.

Specifically, to realize the first electrical configuration illustrated in FIG. 2A, the neutral forming contacts 40A and 40B and the series contacts 42A–44C are opened, while the main contacts 38A, 38B and 38C are operated to apply electric power to terminals 48A, 48B and 48C respectively. To realize the second electrical configuration illustrated in FIG. 2B, the neutral forming contacts 40A and 40B are closed, the series contacts 42A–44C are opened, and the main contacts 38A, 38B and 38C are operated to apply electric power to terminals 50A, 50B and 50C respectively. To realize the third electrical configuration illustrated in FIG. 2C, the neutral forming contacts 40A and 40B and the series contacts 44A–44C are closed, the series contacts 42A–43C are opened, and the main contacts 38A, 38B and 38C are operated to apply electric power to terminals 52A, 52B and 52C respectively. To realize the forth electrical configuration illustrated in FIG. 2D, the neutral forming contacts 40A and 40B are opened, the series contacts 42A–44C are closed, and the main contacts 38A, 38B and 38C are operated to apply electric power to terminals 52A, 52B and 52C respectively.

In order to provide a wide range of torque and speed characteristics, the turns for each of the plurality of windings 30A–30C, 32A–32C, 34A–34C and 36A–36C are different. In one exemplary embodiment, two turns are provided in each of the windings 30A–30C; eight turns are provided in each of the windings 32A–32C; five turns are provided in each of the windings 34A–34C; and eleven turns are provided in each of the windings 36A–36C. In this exemplary embodiment, the motor 10 maximum speed is obtained when operating in the configuration of FIG. 2A and is approximately thirteen times the speed available from the configuration of FIG. 2D. (By using three identical two turn windings connected in parallel, the effective turns of each of the windings 30A, 30B and 30C is less than one.) Likewise, maximum torque is obtained when the motor 10 is operating in the configuration of FIG. 2D and is approximately thirteen times the torque available from the configuration of FIG. 2A.

It is believed electrically isolating unused windings enables the motor to have ranges in speed and torque previously unavailable. Electrically isolating unused windings reduces the amount of insulation needed, thereby reducing space, weight and cost of the motor. Electrically isolating unused windings is particularly advantageous when a range in speed and torque approximately greater than six times is required, and is even more particularly advantageous when a range in speed and torque approximately greater than ten times is required.

The speed versus torque motor characteristics for the configurations illustrated in FIGS. 2A–2D and the turns of the exemplary embodiment, described above, are schematically illustrated in FIG. 3. A solid line 60A represents the speed versus torque characteristics of the first electrical configuration illustrated in FIG. 2A. The motor 10 is capable of its maximum speed for a given amperage of current and a given horsepower rating in this configuration. Furthermore, each of the remaining stator windings of the second plurality 32A–32C, the third plurality 34A–34C and the fourth plurality 36A–36C are electrically isolated from corresponding windings of the first plurality 30A–30C, and preferably, from each other plurality of stator windings. In this configuration, the unconnected stator windings 32A–32C, 34A–34C and 36A–36C have more turns in total than the connected stator windings 30A–30C. By electrically isolating each of the unused plurality of windings 32A–32C, 34A–34C and 36A–36C, excessive over-voltage conditions are prevented, because the voltage generated across each of the windings is not added up in series. Since this configuration has the most unused windings, this configuration has the greatest voltage developed from the back-EMF.

Figure 2B:
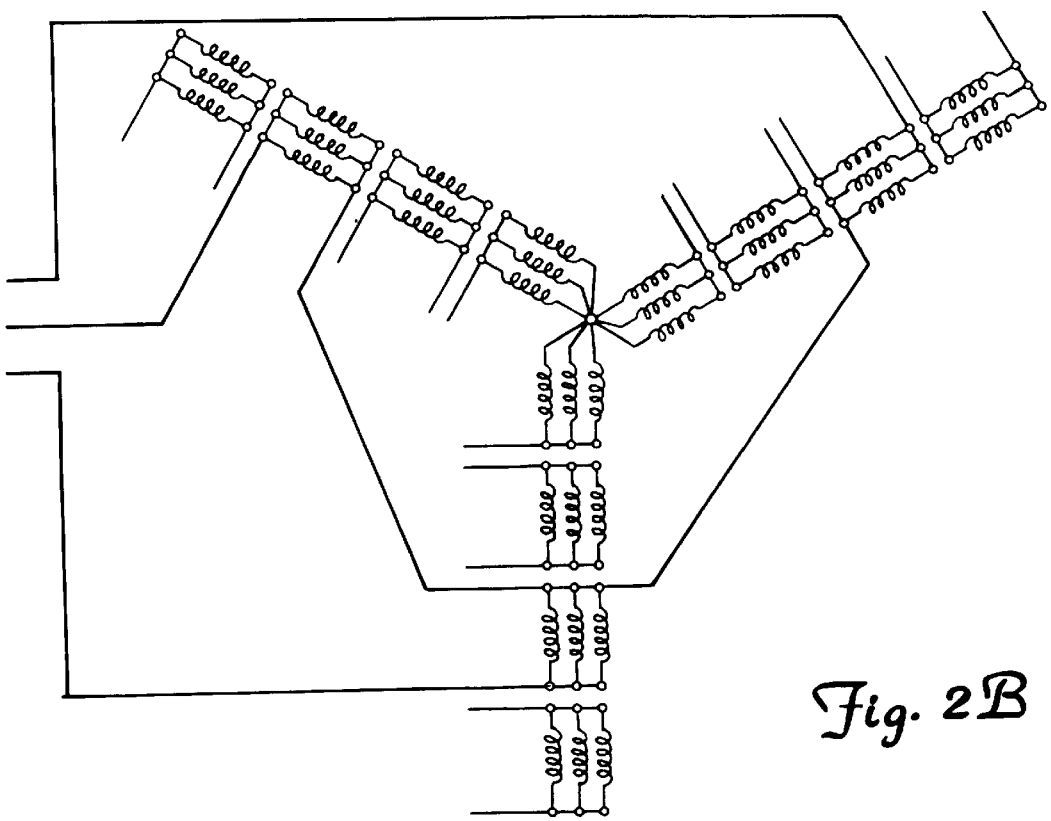
FIG. 2B is a schematic representation of stator windings of the motor of the present invention connected in a second electrical configuration.

A dashed line 60B illustrates the speed versus torque characteristics of the motor when configured as illustrated in FIG. 2B. In this configuration, only the third plurality of windings 34A–34C are operably connected. Preferably the remaining windings 30A–30C, 32A–32C and 36A–36C are electrically isolated.

Figure 2C:
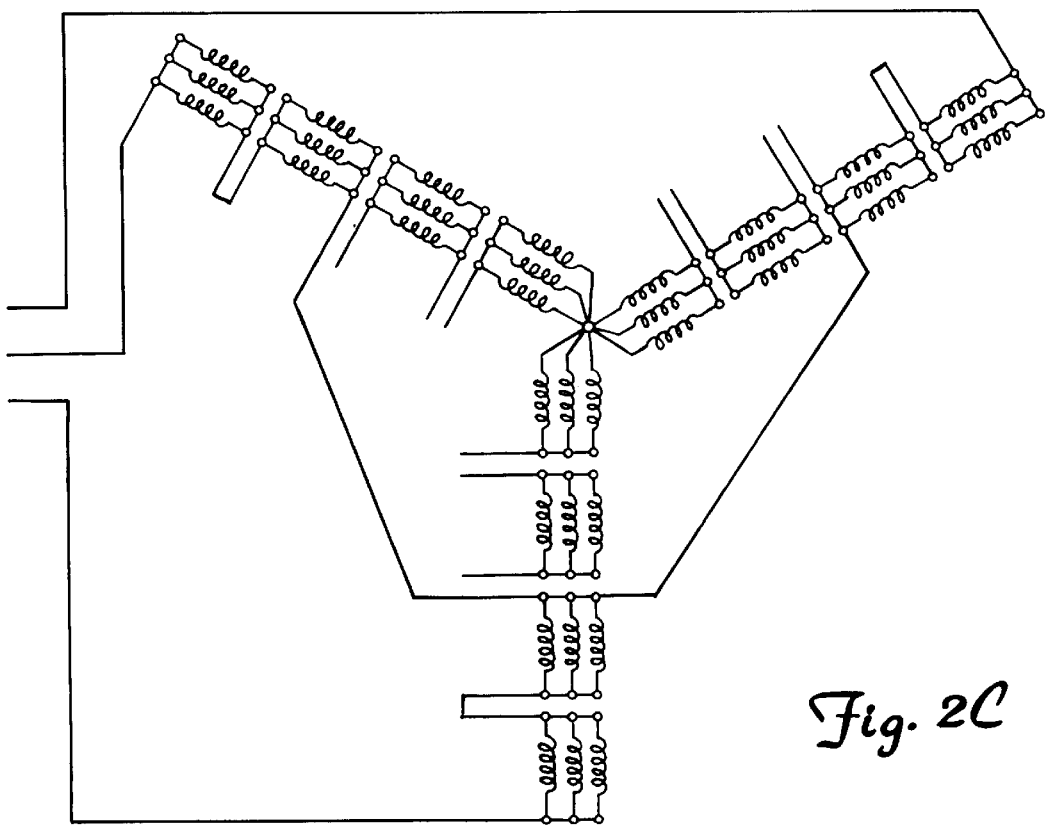
FIG. 2C is a schematic representation of stator windings of the motor of the present invention connected in a third electrical configuration.

A third dashed line 60C illustrates the speed versus torque characteristics of the motor 10 for the given amperage of current for the configuration illustrated in FIG. 2C. In this configuration, only the third plurality of windings 34A–34C and the fourth plurality of windings 36A–36C are operably connected. Preferably the remaining windings 30A–30C and 32A–32C are electrically isolated.

Figure 2D:
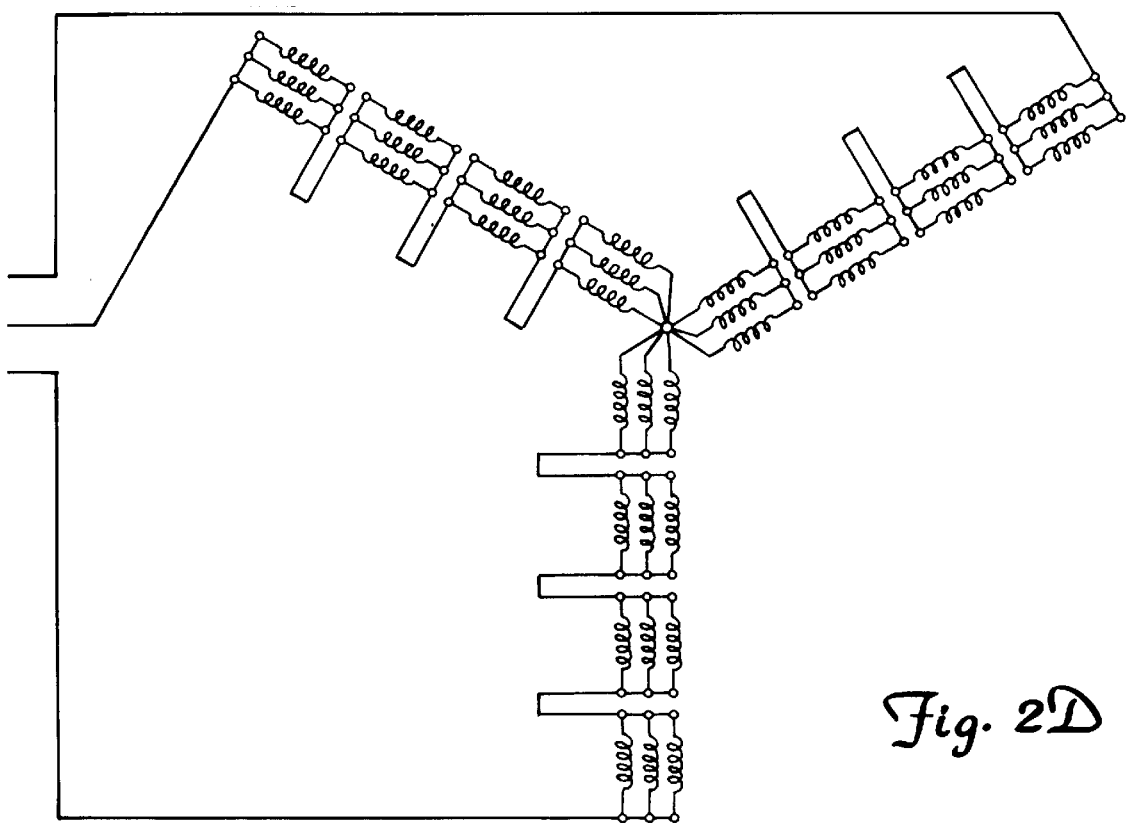
FIG. 2D is a schematic representation of stator windings of the motor of the present invention connected in a fourth electrical configuration.

A fourth dashed line 60D illustrates the speed versus torque characteristics of the motor 10 for the given amperage of current for the configuration illustrated in FIG. 2D. In this configuration, all of the plurality of windings 30A–30C, 32A–32C, 34A–34C and 36A–36C are operably connected and maximum torque is obtained.

It should be understood that if desired, other speed and torque characteristics are obtainable. For instance, additional neutral forming contacts can be provided for the second plurality of windings 32A–32C and the fourth plurality of windings 36A–36C. Likewise, additional contacts can be provided to form other combinations.

FIG. 4 illustrates components of the motor drive 20. A rectifier 80 receives a suitable alternating current input signal on signal lines 82 to produce a fixed positive and negative DC voltages on a positive bus 84 and a negative bus 86, respectively. A capacitor 88 is provided to maintain the positive bus 84 and the negative bus 86 within suitable limits. A three-phase inverter 90 is connected to the positive bus 84 and the negative bus 86 in a conventional manner to provide three-phase commutated current waveforms on power signal lines 15A, 15B and 15C, which are connected to the set of stator windings 14 illustrated in FIG. 1. The inverter 90 is comprised of a power transistor bridge for switching each of the signal lines 15A–15C from an open circuit condition to the positive bus 84 or the negative bus 86. The duty cycle of each transistor bridge is controlled by an inverter driver 94, herein illustrated as a logic array stored in read only memory (ROM). The logic array 100 stored in ROM responds to rotor position feedback signals provided from a resolver 96. A resolver-to-digital converter 98 receives analog signals from the resolver 96 and converts the signals to a binary format suitable for the inverter driver 94. It should be understood that the resolver 96 is but one embodiment for sensing the angular position of the rotor 16. Any suitable sensor such as an encoder or Hall effect sensors could also be used. Likewise, suitable combinational logic could also be used instead of the logic array stored in ROM. Signal line 101 from the controller 12 indicates the selected electrical configuration.

An over-speed limit circuit 108 prevents the contacts 22 (FIG. 1) from being switched from one electrical configuration to another if the motor speed is above a selected level herein, by way of example, illustrated as 200 RPM. The circuit 108 includes a comparator 110 which receives a signal along a signal line 112 proportional to the velocity of the rotor 16 (FIG. 1). A second reference signal provided on signal line 114 corresponds to the selected maximum motor speed in which the electrical configurations can be changed. If the motor speed exceeds the preselected limit, a signal on signal line 116 is provided to the process line controller 12 in order to prevent switching. Switching is not recommended when the induced voltage from the windings would exceed the capability of the inverter 90. In the configurations illustrated in FIGS. 2A–2D, an over-voltage condition could arise when switching from the configuration of FIG. 2A to any of the configurations of FIGS. 2B, 2C or 2D, or when switching from the configuration of FIG. 2B to either of the configurations of FIG. 2C or 2D, or when switching from the configuration of FIG. 2C to the configuration of 2D.

Although the present invention has been described with reference to preferred embodiments, workers skilled in the art will recognize that changes may be made in form and detail without departing from the spirit and scope of the invention. For instance, although described above with respect to forming winding configurations from interconnecting two sets of stator windings, it is within the scope of the present invention to also use suitable circuitry to separately connect separate sets of windings to the inverter, each set of windings being permanently connected in different electrical configurations. Switchable contacts would then be provided to connect the selected electrical configuration to the inverter in order to operate the motor.

What is claimed is:
1. A brushless direct current motor connectable to a DC source, the brushless direct current motor comprising:
   a permanent magnet rotor;
   a first plurality of stator windings operably connected together to form separate phases;
   a second plurality of stator windings;
   a plurality of series contacts, each series contact selectively connecting a stator winding of the second plurality of stator windings in series with a stator winding of the first plurality of stator windings for each phase;

a plurality of main contacts selectively connecting the DC source to the second plurality of stator windings when the series contacts connect the second plurality of stator windings to the first plurality of stator windings in a first electrical configuration, and connecting the DC source to the first plurality of stator windings where the series contacts electrically isolate the second plurality of stator windings from the first plurality of stator windings in a second electrical configuration such that the second plurality of stator windings have opposed unconnected free ends that float when current flows within the first plurality of stator windings; and a commutation circuit commutating the first and second plurality of stator windings when connected in the first electrical configuration or the first plurality of stator windings when connected in the second electrical configuration.

2. The brushless direct current motor of claim 1 wherein the second plurality of stator windings have more turns in total than the first plurality of stator windings.

3. The brushless direct current motor of claim 2 wherein the first electrical configuration comprises a wye-connected configuration and the second electrical configuration comprises a wye-connected configuration.

4. The brushless direct current motor of claim 3 and further comprising:

a third plurality of stator windings; and a second plurality of series contacts, each series contact of the second plurality selectively connecting a stator winding of the third plurality of stator windings in series with a stator winding of the second plurality of stator windings for each phase.

5. The brushless direct current motor of claim 4 wherein the first plurality of stator windings are connected to form a first neutral, and wherein motor further comprises neutral forming contacts connected between each of the phases to form a second neutral remote from the first neutral.

6. The brushless direct current motor of claim 2 wherein a number of turns of the second plurality of stator windings is greater than a number of turns of the first plurality of stator windings to produce approximately six times more torque in the second electrical configuration than the first electrical configuration.

7. The brushless direct current motor of claim 2 wherein the number of turns of the second plurality of stator windings is greater than the number of turns of the first plurality of stator windings to produce approximately ten times more torque in the second electrical configuration than the first electrical configuration.

8. A brushless direct current motor connectable to a DC source, the brushless direct current motor comprising:

a permanent magnet rotor;

a set of stator windings;

means for changeably connecting the set of stator windings to operate in a first electrical configuration or a second electrical configuration, wherein the first electrical configuration includes all of the set of stator windings operably connected together for current from the DC source to flow therein, and wherein the second electrical configuration includes connected stator windings and unconnected stator windings, wherein the connected stator windings comprise less than all of the set of stator windings connected together for current from the DC source to flow therein, and wherein the unconnected stator windings are electrically isolated from the connected stator windings in the second electrical configuration such that a voltage generated across the unconnected stator windings from a back electromotive force as a magnetic field of the rotor interacts with the unconnected stator windings does not add in series with a voltage applied across the connected stator windings; and a commutation circuit commutating the stator windings when connected in the first electrical configuration or the second electrical configuration.

9. The brushless direct current motor of claim 1 wherein the first electrical configuration comprises a wye-connected configuration and the second electrical configuration comprises a wye-connected configuration.

10. The brushless direct current motor of claim 9 wherein the first electrical configuration comprises a plurality of stator windings connected in series in each phase.

11. The brushless direct current motor of claim 1 wherein the first electrical configuration comprises a plurality of stator windings connected in series in each phase.

12. The brushless direct current motor of claim 11 wherein the unconnected stator windings in the second electrical configuration have more turns in total than the connected stator windings in the second electrical configuration.

13. The brushless direct current motor of claim 1 wherein the unconnected stator windings in the second electrical configuration have more turns in total than the connected stator windings in the second electrical configuration.

14. A method for configuring a brushless direct current motor to have different torque and speed characteristics when connected to a DC source, the method comprising the steps of:

providing a plurality of stator windings operably coupleable to a rotor having permanent magnets;

connecting the plurality of stator windings in a first electrical configuration wherein all of the stator windings are operably connected together for current from the DC source to flow therein or a second electrical configuration comprising connected stator windings and unconnected stator windings, wherein the connected stator windings comprise less that all of the stator windings connected together for current from the DC source to flow therein; and electrically isolating the unconnected stator windings from the connected stator windings when the stator windings are connected in the second electrical configuration such that a voltage generated across the unconnected stator windings from a back electromotive interacts magnetic field of the rotor interacts with the unconnected stator windings does not add in series with a voltage applied across the connected stator windings.

15. The method of claim 14 wherein the first electrical configuration comprises a wye-connected configuration and the second electrical configuration comprises a wye-connected configuration.

16. The method of claim 15 wherein the first electrical configuration comprises a plurality of stator windings connected in series in each phase.

17. The method of claim 14 wherein the first electrical configuration comprises a plurality of stator windings connected in series in each phase.

18. The method of claim 17 wherein the unconnected stator windings in the second electrical configuration have more turns in total than the connected stator windings in the second electrical configuration.

19. The method of claim 14 wherein the unconnected stator windings in the second electrical configuration have more turns in total than the connected stator windings in the second electrical configuration.

20. A brushless direct current motor connectable to a DC source, the brushless direct current motor comprising:

a permanent magnet rotor;

a first plurality of stator windings operably connected together to form separate phases;

a second plurality of stator windings;

a plurality of series contacts, each series contact selectively connecting a stator winding of the second plurality of stator windings in series with a stator winding of the first plurality of stator windings for each phase;

a plurality of main contacts selectively connecting the DC source to the second plurality of stator windings when the series contacts connect the second plurality of stator windings to the first plurality of stator windings in a first electrical configuration, and connecting the DC source to the first plurality of stator windings when the series contacts electrically isolate the second plurality of stator windings from the first plurality of stator windings in a second electrical configuration such that a voltage generated across the second plurality of stator windings from a back electromotive force as a magnetic field of the rotor interacts with the second plurality of stator windings does not add in series with a voltage applied across the first plurality of stator windings; and a commutation circuit commutating the first and second plurality of stator windings when connected in the first electrical configuration or the first plurality of stator windings when connected in the second electrical configuration.

21. The brushless direct current motor of claim 20 wherein the second plurality of stator windings have more turns in total than the first plurality of stator windings.

22. The brushless direct current motor of claim 21 wherein the first electrical configuration comprises a wye-connected configuration and the second electrical configuration comprises a wye-connected configuration.

23. The brushless direct current motor of claim 22 and further comprising:

a third plurality of stator windings; and a second plurality of series contacts, each series contact of the second plurality selectively connecting a stator winding of the third plurality of stator windings in series with a stator winding of the second plurality of stator windings for each phase.

24. The brushless direct current motor of claim 23 wherein the first plurality of stator windings are connected to form a first neutral, and wherein motor further comprises neutral forming contacts connected between each of the phases to form a second neutral remote from the first neutral.

25. The brushless direct current motor of claim 21 wherein a number of turns of the second plurality of stator windings is greater than a number of turns of the first plurality of stator windings to produce approximately six times more torque in the second electrical configuration than the first electrical configuration.

26. The brushless direct current motor of claim 21 wherein the number of turns of the second plurality of stator windings is greater than the number of turns of the first plurality of stator windings to produce approximately ten times more torque in the second electrical configuration than the first electrical configuration.

27. A brushless direct current motor connectable to a DC source, the brushless direct current motor comprising:

a permanent magnet rotor;

a set of stator windings;

means for changeably connecting the set of stator windings to operate in a first electrical configuration or a second electrical configuration, wherein the first electrical configuration includes all of the set of stator windings operably connected together for current from the DC source to flow therein, and wherein the second electrical configuration includes connected stator windings and unconnected stator windings having opposed unconnected free ends, wherein the connected stator windings comprise less than all of the set of stator windings connected together for current from the DC source to flow therein, and wherein the unconnected stator windings are electrically isolated from the connected stator windings in the second electrical configuration such that the opposed unconnected free ends of the unconnected stator windings float when current flows within the connected stator windings; and a commutation circuit commutating the stator windings when connected in the first electrical configuration or the second electrical configuration.

28. The brushless direct current motor of claim 27 wherein the first electrical configuration comprises a wye-connected configuration and the second electrical configuration comprises a wye-connected configuration.

29. The brushless direct current motor of claim 28 wherein the first electrical configuration comprises a plurality of stator windings connected in series in each phase.

30. The brushless direct current motor of claim 27 wherein the first electrical configuration comprises a plurality of stator windings connected in series in each phase.

31. The brushless direct current motor of claim 30 wherein the unconnected stator windings in the second electrical configuration have more turns in total than the connected stator windings in the second electrical configuration.

32. The brushless direct current motor of claim 27 wherein the unconnected stator windings in the second electrical configuration have more turns in total than the connected stator windings in the second electrical configuration.

33. A method for configuring a brushless direct current motor to have different torque and speed characteristics when connected to a DC source, the method comprising the steps of:

providing a plurality of stator windings operably coupleable to a rotor having permanent magnets;

connecting the plurality of stator windings in a first electrical configuration wherein all of the stator windings are operably connected together for current from the DC source to flow therein or a second electrical configuration comprising connected stator windings and unconnected stator windings having opposed unconnected free ends, wherein the connected stator windings comprise less that all of the stator windings connected together for current from the DC source to flow therein; and electrically isolating the unconnected stator windings from the connected stator windings such that the opposed unconnected free ends float when the stator windings are connected in the second electrical configuration.

34. The method of claim 33 wherein the first electrical configuration comprises a wye-connected configuration and the second electrical configuration comprises a wye-connected configuration.

35. The method of claim 34 wherein the first electrical configuration comprises a plurality of stator windings connected in series in each phase.

36. The method of claim 33 wherein the first electrical configuration comprises a plurality of stator windings connected in series in each phase.

37. The method of claim 36 wherein the unconnected stator windings in the second electrical configuration have more turns in total than the connected stator windings in the second electrical configuration.

38. The method of claim 33 wherein the unconnected stator windings in the second electrical configuration have more turns in total than the connected stator windings in the second electrical configuration.

* * * * *

UNITED STATES PATENT AND TRADEMARK OFFICE
CERTIFICATE OF CORRECTION

PATENT NO. : 5,821,660
DATED : October 13, 1998
INVENTOR(S) : Anderson

It is certified that error appears in the above-indentified patent and that said Letters Patent is hereby corrected as shown below:

```
On the title page, item

[56]      References Cited

Insert --2,436,331  2/1948   Robinson  318/224--
Insert --4,296,344  10/1981  Rabe      310/184--
Insert --5,451,854  9/1995   Uuskoski  318/778--

Column 8, line 10, replace "1" with --8--.

Column 8, line 17, replace "1" with --8--.

Column 8, line 25, replace "1" with --8--.

Column 8, line 41, replace "that" with --than--.

Column 8, line 49, replace "interacts" with
--force as a--. (1st occurrence)

Column 10, line 56, replace "that" with --than--.
```

Signed and Sealed this

Thirtieth Day of March, 1999

Attest:

Q. TODD DICKINSON

*Attesting Officer*　　　*Acting Commissioner of Patents and Trademarks*